Figure 1:
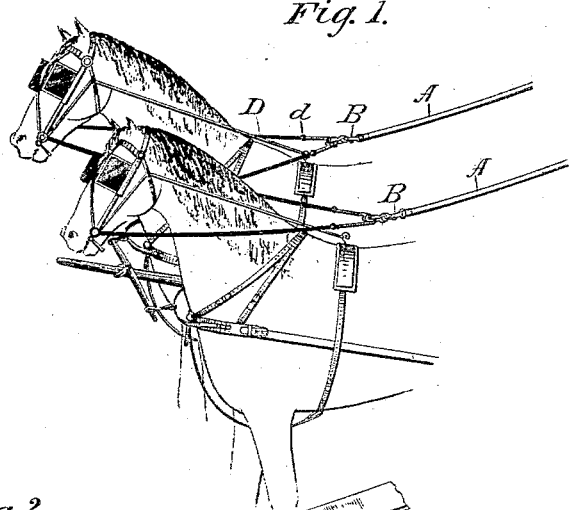

(No Model.)

A. J. HALL.
DOUBLE DRIVING REIN.

No. 339,405. Patented Apr. 6, 1886.

Witnesses
James M. Stewart
H. J. Daly

Inventor
A. J. Hall.
By his Attorney
W. A. Redmond

UNITED STATES PATENT OFFICE.

ABSALOM J. HALL, OF MONTGOMERY, ALABAMA.

DOUBLE DRIVING-REIN.

SPECIFICATION forming part of Letters Patent No. 339,405, dated April 6, 1886.

Application filed January 20, 1886. Serial No. 189,172. (No model.)

*To all whom it may concern:*

Be it known that I, ABSALOM J. HALL, a citizen of the United States, residing at Montgomery in the county of Montgomery, State of Alabama, have invented certain new and useful Improvements in Double Driving-Reins, of which the following is a specification, reference being had therein to the accompanying drawings.

In the ordinary double reins at present in common use the left driving-rein passes to the near-side bit-ring of the near horse, and the check-line proceeds from the said left driving-rein to the near bit-ring of the off horse, and the right driving-rein passes directly to the off bit-ring of the off horse and has a check-line which connects with the off bit-ring of the near horse, both check-lines being buckled or otherwise so secured to the driving-reins that they form substantially a part thereof. It will be seen therefore that any side pull on the driving-reins will cause a slackening of one of the driving-reins and one of the check-lines, and the extent of this slackening is in proportion to the length of the check-lines, it being greatest with short check-lines. For instance, should the pull be toward the left, the left driving-rein from the point of its connection with its check-line to the near bit-ring of the near horse will be slackened, while the pull will be on the near bit-ring of the off horse through the check-line, and on the off bit-ring of the off horse through the right driving-rein, thus leaving the near horse free or without pull, and vice versa, should the pull be toward the right. It is true that it has been sought to cure this difficulty by extending the check-lines back nearly to the driver's hands before connecting them to the driving-reins; but this expedient is only partially successful, and, besides, adds to the cost of the reins, owing to the greater quantity of material used. Also, it is found, where a hard-mouthed and an easy-mouthed horse are driven together, that it is almost impossible to restrain the hard-mouthed animal from traveling in advance of his mate, because pulling him in necessarily involves the pulling in of his mate, and consequently a maintenance of their relative positions.

It frequently happens that one of the check-lines is longer than the other, or that they are improperly adjusted, so that the horses' heads are pulled too far apart or too close together, or that one of the horses of a team will be compelled to carry his head turned inwardly toward the other, or vice versa, thus causing the horse pain and making him fretful and nervous. Now, my invention is intended to obviate the above-named objectionable feature of the double-driving rein, and to cause the pull to be equalized on both horses and on both sides of each horse's mouth—something that, I believe, has never been accomplished heretofore; and it consists of the parts and combinations of parts hereinafter described and claimed.

Figure 2:
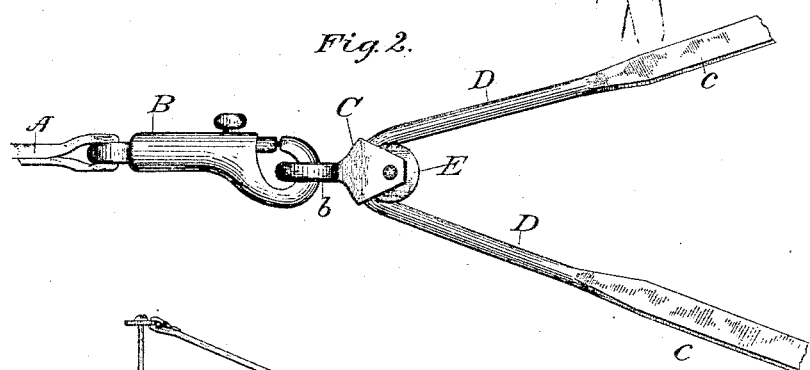
Figure 3:
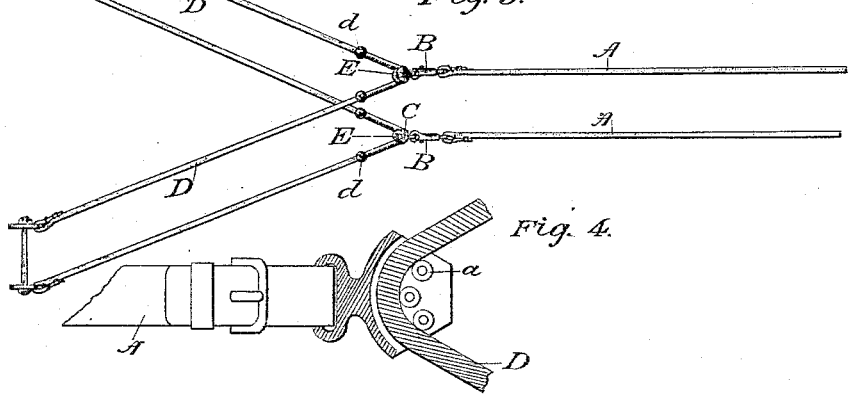

In the accompanying drawings, forming a part of this specification, Figure 1 shows my device as applied to a team; Fig. 2, a view in detail showing a modification of the check-rein; Fig. 3, a plan view, and Fig. 4 a modification of the pulley.

Similar letters refer to similar parts throughout all the views.

Figure 4:
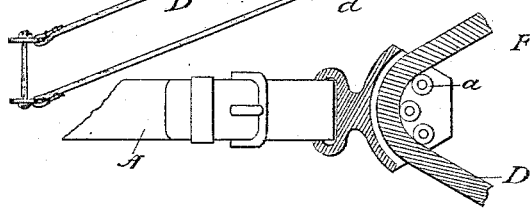

A represents the driving reins or lines, and B snap hooks or clips, to which the ends of the reins are attached by means of buckles or rings, or in any other desired manner, so that a secure connection is made between them. To these hooks or clips B pulleys are attached by means of rings or lugs b, which project from the shells C of the pulleys, or in any other suitable manner. The hooks or clips B are not absolutely necessary, as I may attach or fasten the ends of the reins to the pulleys direct, as shown in Fig. 4, if I so desire. The check-lines D are passed around the pulley-wheels E and lead directly to the bit-rings, as in ordinary reins. It will be noticed that the check-lines only extend back as far as the saddle, and thus effect a saving in material. It will also be observed that they are independent of the driving-lines—in other words, are like a bridle rein in that they are continuous from bit-ring to bit-ring, and not in separate straps, as is the ordinary check-line—and that the driving-lines only extend as far forward as the pulleys to which they are connected, and not to the bit-ring, as customary. The check-lines are provided with buckles or clips for attaching them to the bit-rings. The check-lines may be round lines throughout, so that the pulleys will run over them easily to the center of the strain put on them by the driving-reins, and thus equalize the pull on the horses, the pulley-wheels being grooved when the lines are round; but I may use flat lines and plain-faced pulley-wheels, if desired. As shown in Figs. 1 and 3, the lines are rounded, and have secured to them on each side of the pulleys small round buttons or other suitable stops, *d*, thus limiting the play of the pulleys to the distance between the stops. This gives sufficient play to guide the team, and at the same time prevents either of the horses from traveling in advance of the other any appreciable or noticeable distance, for as soon as the pulley-wheels run along the lines to the buttons they will be stopped by the buttons and the advance of the horse checked. I also contemplate using flat lines, as at *c*, Fig. 2, rounded for a short distance from their centers, and thus do away with the buttons, as the flat lines will prevent the pulleys passing over them.

I do not wish to be limited to one pulley-wheel on the end of each driving-rein, as it is perfectly obvious that the shell of the pulley may contain two or more wheels, as shown in Fig. 4, in which *a* is the wheels, similar in their action to friction-wheels; D, the check-line, and A the driving-reins.

Having thus described my invention, what I claim as new, and desire to secure by Letters Patent, is—

1. The combination of the driving-reins A, the check-lines D, each of which is formed in one continuous piece, and the pulleys, substantially as and for the purpose described.

2. The combination of the driving-reins, the clips, the pulleys, and the check-lines, substantially as and for the purpose described.

3. The hereinbefore-described check-line for double driving-reins, formed in one continuous piece and adapted to connect the bit-rings.

4. The combination of the double driving-reins, the pulleys, means for attaching the ends of the reins to the pulleys, and the check-lines, substantially as and for the purpose described.

5. The combination, in a double driving-rein, of the pulleys, the partly-round check-line, and means for limiting the play of the pulleys on the check-line, as and for the purpose set forth.

6. The combination of the double driving-reins, the pulleys, the check-lines, and suitable stops, *d*, substantially as and for the purpose described.

7. A pair of check-lines for double driving-reins, provided with stops, substantially as described.

8. A pair of check-lines for double driving-reins, consisting of the rounded lines and the buttons, substantially as and for the purpose described.

9. As a new article of manufacture, the driving-reins having their ends provided with pulley-wheels, substantially as described.

In testimony whereof I affix my signature in presence of two witnesses.

ABSALOM J. HALL.

Witnesses:
H. RANDOLPH,
J. L. HARRISON.